J. J. SCHRAMM.
CONVERTIBLE AUTOMOBILE BODY.
APPLICATION FILED JULY 25, 1917.

1,276,970.

Patented Aug. 27, 1918.
2 SHEETS—SHEET 1.

INVENTOR
Jos. J. Schramm
BY Edward E. Longan
ATTORNEY

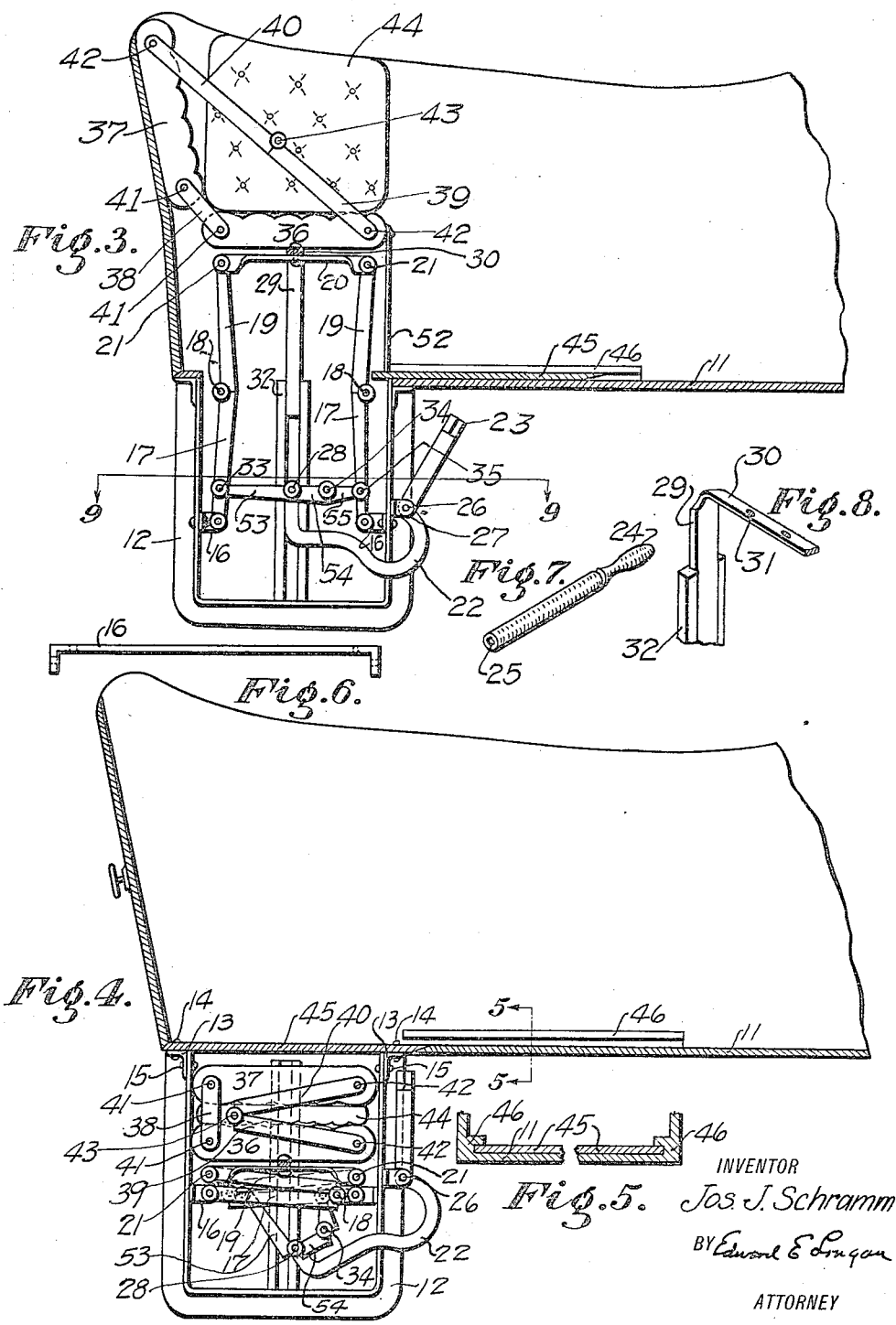

UNITED STATES PATENT OFFICE.

JOSEPH J. SCHRAMM, OF ST. LOUIS, MISSOURI.

CONVERTIBLE AUTOMOBILE-BODY.

1,276,970.   Specification of Letters Patent.   Patented Aug. 27, 1918.

Application filed July 25, 1917. Serial No. 182,635.

*To all whom it may concern:*

Be it known that I, JOSEPH J. SCHRAMM, a citizen of the United States, and resident of St. Louis and State of Missouri, have invented new and useful Improvements in Convertible Automobile-Bodies, of which the following is a specification containing a full, clear, and exact description, reference being had to the accompanying drawings, forming a part hereof.

My invention relates to improvements in convertible automobile bodies and my object is to provide a folding seat which may be folded into a housing provided therefor and located beneath the floor of the automobile and unfolded or raised from the housing to a position above the floor, automatically locking itself in its raised position, all by the manipulation of a single lever, whereby the automobile may be readily converted from a passenger or touring car to a delivery or freight car, or vice versa, and my further object is to provide a folding seat of the locking toggle joint type, whose mechanism is simple, its operation effective and reliable for the purpose designed, its parts comparatively few, of strong construction and not readily damaged in use, thus avoiding the inconvenience and expense of frequent repair and replacement of parts.

Further, this invention consists in a combination of parts set forth in the following specification. Other objects and advantages will be apparent in the course of the following description taken in conjunction with the accompanying drawings and the particular feature of novelty will be pointed out in the appended claims.

In the drawings forming part of this specification, wherein like numerals of reference denote like parts wherever they may appear:

Fig. 3 is a fragmental longitudinal sectional elevation of an automobile illustrating the folding or collapsible seat in its raised position ready for use.

Fig. 4 is a sectional elevation duplicating Fig. 3 with the exception that the seat is folded or collapsed whereby the automobile may be used for delivery purposes.

Fig. 5 is a section on the line 5—5 Fig. 4 illustrating in detail the tongue and groove sliding floor over the housing for the collapsible seat.

Fig. 6 is a plan view of the fulcrum brackets which extend crosswise in the housing.

Fig. 7 is a perspective of the removable handle that is employed to operate the bellcrank for elevating and lowering the seat.

Fig. 8 is a fragmental view, in perspective of the seat guides, which direct the seat in its vertical movement holding it perpendicular to the floor of the automobile at all times.

Figure 1:
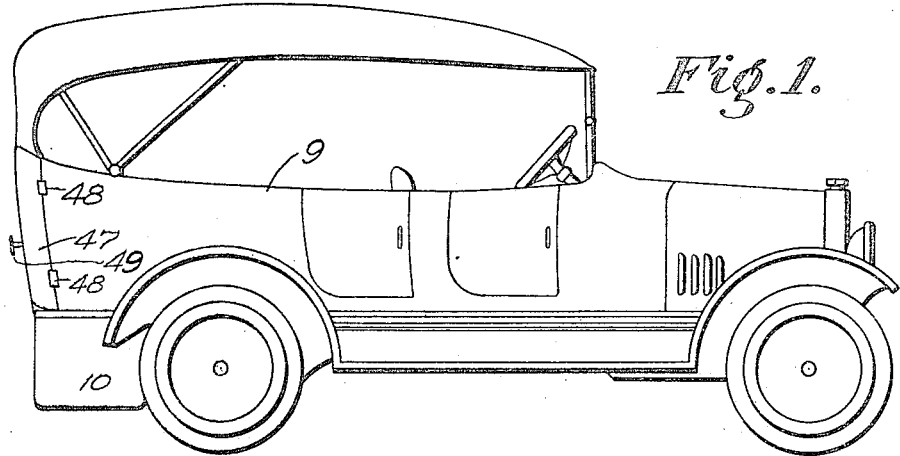
Figure 1 represents a side elevation, conventionally, of an automobile embodying my improvements.
Figure 2:
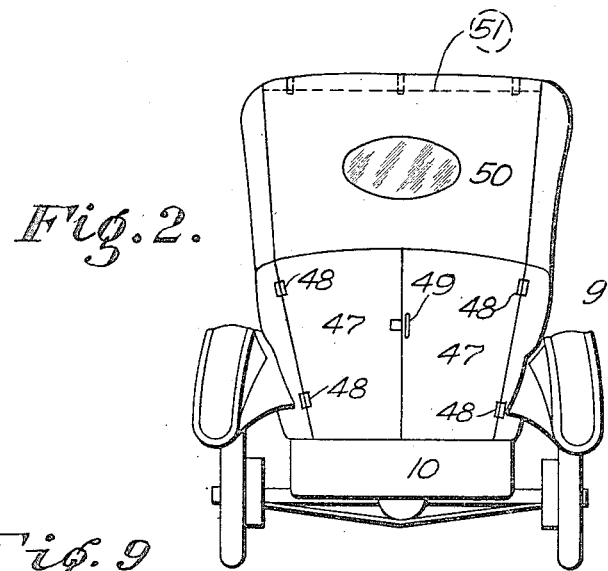
Fig. 2 illustrates a rear elevation of the automobile represented in Fig. 1.
Figure 9:
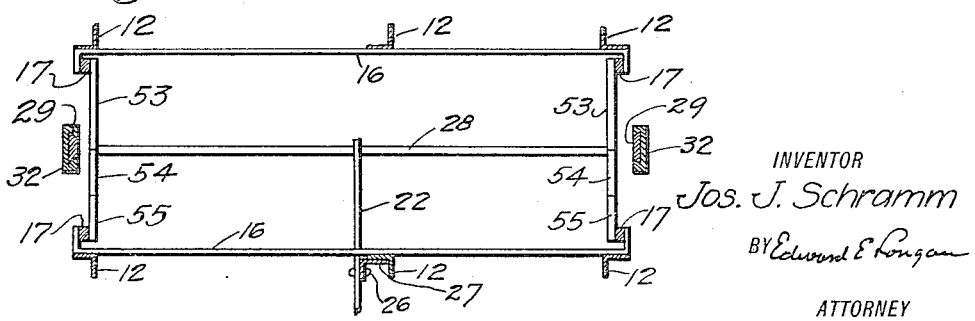
Fig. 9 is a transverse section taken on the line 9—9 of Fig. 3 looking downward.

Referring to the drawings by numerals, in Fig. 1, 9 designates the body of an automobile of which the hood, running gear and front seat may be of suitable construction, and whose body, as shown carries a front door providing access to the front seat and whose second door provides access to the rear seat.

As clearly shown in the figure, the length departs somewhat from the ordinary, in that it projects sufficiently over the rear axle and differential gear housing to provide ample room for my device and its housing.

A novelty of this overhanging body is that it gives the car a more streamline effect and adds to its appearance.

With reference to Fig. 3, this housing 10 is located beneath the floor 11 of the automobile and consists of a pair of supporting angles 12, bolted to the underside of the floor 11 by means of other angle irons 13 and bolts 14 and is riveted to the supporting angles 12 at 15, thus simply but rigidly securing the supported bed of the folding seat to the automobile floor 11.

Secured conveniently to the supporting angles 12, are the combination fulcrum bracket and tie yoke 16 which reinforces the supporting angles 12 and carries the weight of the seat, its mechanism and persons seated thereon.

Pinned to the bracket 16 of which a plan is shown in Fig. 6 are the shanks 17 of the toggle joint, which bends inwardly at the knee or splice 18, carrying with it the thigh portion 19, which fulcrums at the outer extremity of the tie yoke 20 at 21, when the seat is collapsed as shown in Fig. 4.

The folding of the seat is accomplished by the bell-crank 22 having one end 23 formed to receive the socket 25 of the handle 24, as shown in Fig. 7. This handle is kept in the tool chest or some other convenient place when not in use. This handle 24 is inserted through a slot in the floor 11 of the automobile and is made detachable so as not to be in the way of packages, boxes, etc., when car is used for delivery purposes or when seat is raised to be an obstacle in the floor of the car.

The bell-crank 22 revolves in its circular arc path around the pin 26; said pin being mounted securely in the angle bracket 27, which is fastened inside the leg of the supporting angles 12, and has its crank extremity pinned to the lower operating tie yoke at 28. This lower tie yoke consists of three links, the first comprising one-half of the entire yoke fulcrumed at 28 and 33, designated by the numeral 53, and the other two, quarters, bending in the angles as shown in Fig. 4 when the seat is lowered. The remainder of the lower tie yoke comprises the parts 54 and 55 which are pivoted or fulcrumed at 28, 34 and 35.

The toggle is made rigid vertically by having dove tailed slides and slide holders on both ends of the collapsible seat, a perspective of same being shown in Fig. 8 in which 29 is the slide, and integral with said slide the seat supporting bar 30 which is bolted to seat through holes 31, and tie yoke 20, said slide 29 operating in the slide holder 32 when the seat is raised or lowered to or from the bed or floor 11 of the car.

The seat 36 attached to the seat support 30 by bolts through holes 31 is linked to the seat back 37 by the link 38 and the locking arms 39 and 40; said link 38 being secured to seat 36 and lock 37 by pins 41 and said arms 39 and 40 being secured to seat and back by pins 42 and spliced in the center at 43, which forms a lock joint.

The folding and collapsing of the seat consists of first folding the hinged sides 44, then breaking the toggle lock at 43 and folding over the back 37, then lowering same by handle 24 being connected to bell-crank 26 and pulling said handle upward. Covering this folding seat is the sliding floor section 45, which slides longitudinally through the ways 46 of the floor 11, thus providing an ample but inexpensive combination floor and cover for the seat.

The rear doors 47, are hinged and are provided with a handle and lock at 49 to open said doors when the car is to be used for delivery purposes, and when so used, it is advisable to keep the rear curtain 50, rolled up, as shown by the dotted lines at 51, so as to not interfere with the loading and the unloading of articles. The inside lining of the rear compartment is made removable so as to avoid soiling when used for delivery purposes. When the seats have been elevated for use, the curtain 52 is attached, thus obscuring the mechanism for elevating and lowering the seats.

Having thus described my invention, what I claim is:

1. The combination of an automobile body having a front seat and a front side door opening and a side rear door opening, of a housing located in the rear of the car body and below the car floor, a collapsible seat adapted to be positioned within said housing, toggle joints located at each end of the seat for supporting said seat, a bell crank lever for breaking the toggle joints and collapsing the seat, a sliding floor section forming a cover for said housing when the seat has been collapsed, and rear doors hinged above said housing and affording access to the rear of the car body.

2. A convertible automobile body comprising a body provided with side entrances and a front seat, a housing depending from and located in the rear of said body, a pair of hinged doors arranged in the rear of said body, a collapsible seat having back and sides adapted to be positioned within the housing, toggle joints located at each end of the seat for supporting the same, and a lever projecting through the floor of the car for operating the toggle joints for elevating and lowering the seat.

3. A convertible automobile body provided with side entrance doors and a front seat, a housing positioned beneath the floor of said body and behind the rear axle, toggle joints pivoted at the lower ends within the housing and connected at their upper end by tie rods, guide plates oppositely disposed within the housing, slides located in said guide bars, a plate connecting said slides and seat mounted on said plate, a break lever pivotally secured to each pair of toggle joints, a rod connecting said break levers, a bell-crank pivotally secured to said rod, and provided with a handle projecting through the floor of the body for breaking the toggle joints for lowering the seat.

4. A convertible automobile body comprising a body provided with a front seat and side entrance doors, a housing secured to and depending below the floor of said body, a sliding floor section adapted to form a cover for said housing, a pair of toggle joints pivotally mounted at their lower ends within the housing, a break lever pivoted to each pair of toggle joints, a bell-crank provided with a detachable handle for breaking said break levers, a guiding bar positioned above the toggle joints, and a folding seat carried by said guiding bar.

In witness whereof, I have signed my name to this application, in presence of two subscribing witnesses.

JOSEPH J. SCHRAMM.

Witnesses:
 CLARA L. PRATT,
 P. A. WEGEMER.

Copies of this patent may be obtained for five cents each, by addressing the "Commissioner of Patents, Washington, D. C."